United States Patent
Shukla et al.

(10) Patent No.: US 10,091,669 B2
(45) Date of Patent: *Oct. 2, 2018

(54) METHODS AND APPARATUS FOR REDUCING CALL DROP RATE

(71) Applicant: Apple Inc., Cupertino, CA (US)

(72) Inventors: Umesh K. Shukla, Sunnyvale, CA (US); Sachin J. Sane, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/012,573

(22) Filed: Feb. 1, 2016

(65) Prior Publication Data

US 2016/0242045 A1 Aug. 18, 2016

Related U.S. Application Data

(63) Continuation of application No. 14/270,223, filed on May 5, 2014, now Pat. No. 9,253,664, which is a continuation of application No. 13/629,431, filed on Sep. 27, 2012, now Pat. No. 8,718,726.

(Continued)

(51) Int. Cl.
*H04W 24/02* (2009.01)
*H04W 76/34* (2018.01)
(Continued)

(52) U.S. Cl.
CPC ............ *H04W 24/02* (2013.01); *H04L 43/10* (2013.01); *H04L 47/765* (2013.01);
(Continued)

(58) Field of Classification Search
CPC ..... H04W 24/02; H04W 76/25; H04W 76/34; H04W 4/00; H04W 28/0215;
(Continued)

(56) References Cited

U.S. PATENT DOCUMENTS

| | | | |
|---|---|---|---|
| 6,668,175 B1 * | 12/2003 | Almgren | ................. H04L 47/14 455/516 |
| 8,504,004 B2 | 8/2013 | Austin | |

(Continued)

FOREIGN PATENT DOCUMENTS

| | | |
|---|---|---|
| CN | 1640176 A | 7/2005 |
| CN | 1926804 A | 3/2007 |

(Continued)

OTHER PUBLICATIONS

PCT Application No. PCT/US2013/030992—Invitation to Pay Additional Fees dated Feb. 10, 2014.

(Continued)

*Primary Examiner* — Obaidul Huq

(74) *Attorney, Agent, or Firm* — Dickinson Wright RLLP

(57) ABSTRACT

Methods and apparatus for reducing voice call drop rate are disclosed. Existing devices do not account for the added burden of background services on voice calls. Specifically, multi-RAB scenarios (e.g., a voice call and background services) can experience significant reduction in call quality. Accordingly, in one exemplary embodiment, background services that are not time-critical and/or application-critical can be suspended while a voice call is in progress. By suspending background traffic during a call, the device can avoid unnecessary multi-RAB voice call operation, which significantly improves overall network operation and user experience.

20 Claims, 4 Drawing Sheets

Related U.S. Application Data

(60) Provisional application No. 61/612,121, filed on Mar. 16, 2012.

(51) Int. Cl.
  *H04W 76/25* (2018.01)
  *H04W 4/00* (2018.01)
  *H04L 12/26* (2006.01)
  *H04L 12/919* (2013.01)
  *H04L 12/927* (2013.01)
  *H04W 28/02* (2009.01)
  *H04W 88/06* (2009.01)
  *H04W 4/02* (2018.01)
  *H04L 12/911* (2013.01)

(52) U.S. Cl.
  CPC ............ *H04L 47/805* (2013.01); *H04W 4/00* (2013.01); *H04W 28/0215* (2013.01); *H04W 28/0242* (2013.01); *H04W 76/25* (2018.02); *H04W 76/34* (2018.02); *H04L 47/824* (2013.01); *H04W 4/02* (2013.01); *H04W 88/06* (2013.01)

(58) Field of Classification Search
  CPC ... H04W 28/0242; H04W 4/02; H04W 88/06; H04L 43/10; H04L 47/765; H04L 47/805; H04L 47/824
  USPC .......................................... 370/241, 242, 244
  See application file for complete search history.

(56) References Cited

U.S. PATENT DOCUMENTS

| | | | |
|---|---|---|---|
| 8,718,726 B2 | 5/2014 | Shukla et al. | |
| 2005/0064891 A1* | 3/2005 | Chaudry | H04W 76/066 455/527 |
| 2005/0213576 A1 | 9/2005 | Stephens | |
| 2006/0182059 A1* | 8/2006 | Itaba | H04W 76/12 370/329 |
| 2008/0080458 A1 | 4/2008 | Cole | |
| 2008/0085717 A1 | 4/2008 | Chhabra et al. | |
| 2011/0274085 A1 | 11/2011 | Geary et al. | |
| 2012/0000930 A1 | 1/2012 | Barbieri | |
| 2012/0009930 A1 | 1/2012 | Brisebois et al. | |
| 2013/0003523 A1 | 1/2013 | Singh et al. | |
| 2013/0182681 A1 | 7/2013 | Sane et al. | |
| 2014/0071888 A1 | 3/2014 | Khay-Ibbat | |

FOREIGN PATENT DOCUMENTS

| | | |
|---|---|---|
| JP | 2005286670 A | 10/2005 |
| JP | 2010505347 A | 2/2010 |
| JP | 2010506270 A | 2/2010 |
| WO | WO03075597 A1 | 9/2003 |
| WO | WO2005104600 A1 | 11/2005 |

OTHER PUBLICATIONS

PCT Application No. PCT/US2013/030992—International Search Report & Written Opinion dated Jun. 12, 2014.
Japanese Patent Application No. 2015-500566—Office action dated Aug. 31, 2015.
Chinese Patent Application No. 201380013785.X—Office Action dated Jun. 20, 2017.
Taiwanese Patent Application No. 102109357—Office Action and Search Report dated Dec. 17, 2014.
Korean Patent Application No. 10-2015-7031562—Office Action dated Jan. 13, 2016.
Japanese Patent Application No. 2015-500566—Office Action dated Jul. 29, 2016.

* cited by examiner ion; responsive to the detection of the user-initiated

METHODS AND APPARATUS FOR REDUCING CALL DROP RATE

CROSS REFERENCE TO RELATED APPLICATIONS

This application is a continuation of U.S. patent application Ser. No. 14/270,223, filed May 5, 2014, which is a continuation of U.S. patent application Ser. No. 13/629,431, filed Sep. 27, 2012, which claims the benefit of U.S. Provisional Patent Applicant No. 61/612,121 filed Mar. 16, 2012, all of which are incorporated by reference herein in their entireties.

BACKGROUND

The present disclosure relates generally to the field of wireless communication. More particularly, in one exemplary embodiment, methods and apparatus for reducing voice call drop rate are presented.

Cellular devices have expanded in complexity and utility over time; existing so-called "smartphones" can make phone calls, perform data transactions, record and playback multimedia, and perform a wide variety of other tasks. Many smartphones (such as the exemplary iPhone® manufactured by the Assignee hereof) have access to thousands of different applications which can be downloaded by the user to personalize the smartphone capabilities and functionality.

Many software applications utilize so-called "background services". Background services are software processes which are not under the direct control of an interactive user, but which instead manage ongoing tasks such as: responding to requests, fetching data, synchronizing data, managing hardware components, managing software processes, etc. Common examples of background services include without limitation: push services (i.e., the network "pushes" data to the device, or vice versa), pull services (i.e., the device "pulls" data from the network), location based services, mail exchange services, cloud synchronization services (i.e., the device synchronizes data to a network "cloud" of servers), etc.

Generally, users are not aware of background services; background services provide a seamless and enhanced user experience by offloading the minutiae of device management from the user.

However, background services can trigger periodic data activity on the phone (unbeknownst to the user). If the user is engaged in a voice call when a background service initiates a data transaction, then the device must change to a Multi-Radio Access Bearer (multi-RAB) operation.

As a brief aside, calls (such as for example voice-only calls) are typically circuit-switched (CS) services whereas data services are packet-switched (PS) services. Multi-RAB operation is required to support multiple simultaneous connections (such as a CS connection and a PS connection).

Unfortunately, empirical and anecdotal evidence suggests that multi-RAB operation is not as robust as normal operation; thus, changing from normal operation to multi-RAB operation during a call can increase the risk of dropping the ongoing call.

SUMMARY

The present disclosure provides, inter alia, apparatus and methods for increasing mobile device performance, including e.g., reducing voice call drop rate in a mobile device.

A method for increasing call performance of a wireless device configured to support one or more circuit-switched radio access bearers (CS RABs) and packet-switched radio access bearers (PS RABs) is disclosed. In one embodiment, the method includes: running one or more background packet-switched (PS) applications, at least one of the one or more background PS applications in communication with a network via a PS RAB associated therewith; responsive to a circuit-switched (CS) session being initiated, suspending the at least one of the one or more background PS applications; and responsive to the circuit-switched session terminating, resuming the one or more background PS applications.

In one such variant, the CS session includes a voice call, and the one or more background PS applications include a non-voice data service.

In another variant, suspending the one or more background PS applications prevents a multi-RAB session.

In a third variant, the CS session is initiated by a user initiated voice call.

In a fourth variant, the one or more background PS applications are time-insensitive non-critical services.

In a fifth variant, the method further includes estimating a performance loss the one or more background PS applications will cause if not suspended.

In a sixth variant, the method further includes estimating a likelihood of dropping the CS session if the one or more background PS applications remain active.

In a seventh variant, resuming the one or more background PS applications includes initializing the one or more background PS applications.

In an eighth variant, the method includes notifying the network of the suspension of the one or more background PS applications.

An apparatus configured to prevent multiple radio access bearer (multi-RAB) calls is disclosed. In one embodiment, the apparatus includes: a modem; a processor; and a non-transitory computer readable apparatus having a storage medium with at least one computer program stored thereon, the at least one computer program configured to, when executed on the processor, cause the processor to: transact data via one or more non-voice related background processes; responsive to a circuit-switched call, determine the likelihood of circuit-switched call failure if the one or more non-voice related background processes are not terminated; and when the determined likelihood exceeds an acceptable threshold, temporarily suspend the one or more non-voice related background processes.

In one variant, the determined likelihood is based at least in part on the difference in bit rate between a circuit-switched radio access bearer (CS RAB) and a multi-RAB.

In another variant, the one or more non-voice related background processes includes a mail exchange service configured to electronic mail messages.

In a third variant, the one or more non-voice related background processes includes a cloud-based storage service configured to store user data in a remote network entity.

In a fourth variant, the one or more non-voice related background processes includes a push notification service configured to provide user alerts.

In a fifth variant, the suspension of one or more non-voice related background processes are based at least in part on user selection.

A wireless device is disclosed. In one embodiment, the wireless device includes: a wireless interface configured to communicate with a wireless network; logic configured to detect a user-initiated circuit-switched on the wireless interface; and logic configured to postpone a non-user-initiated service during the circuit switched session.

A method for postponing message delivery is disclosed. In one embodiment, the method includes: receiving a message at a base station associated with a mobile device, the message causing the base station to halt background services during a voice call session of the mobile device; and when a push message for a background service for the mobile device is received during the voice call session of the mobile device, postponing delivery of the push message.

A wireless network apparatus is disclosed. In one embodiment, the wireless network apparatus includes: a wireless interface, the wireless interface configured to communicate with a plurality of wireless devices; a processor; and a computer readable apparatus having a storage medium with at least one computer program stored thereon, the at least one computer program configured to, when executed on the processor, cause the processor to: limit bandwidth available for packet-switched background services transmitted to a wireless device when the wireless device has an active circuit-switched session.

In one variant, the packet-switched background services cause the wireless device to switch to multi-RAB (Radio Access Bearer) operation.

A wireless network apparatus is disclosed. In one embodiment, the wireless network apparatus includes: a wireless interface, the wireless interface configured to communicate with a plurality of wireless devices; logic configured to enable message delivery for one or more non-user-initiated services; and logic configured to disable message delivery for the one or more non-user-initiated services while a user-initiated service is active.

A method for increasing call performance of wireless devices is disclosed. In one embodiment, the method includes: determining whether a call is in progress on the wireless device; and if a call is determined to be in progress, suspending a background service running on the wireless device during the call. In one implementation, the background service is a non-voice use of a network.

An apparatus adapted to reduce a call drop rate is disclosed. In one embodiment, the apparatus includes: a modem; a processor; and a non-transitory computer readable apparatus having a storage medium with at least one computer program stored thereon. In one variant, the at least one computer program is configured to, when executed on the processor determine whether a call is in progress on the wireless device using the modem, and if a call is determined to be in progress, suspend a background service (such as a non-voice use of a network) running on the wireless device during the call.

A system to reduce a call drop rate is disclosed.

A computer readable apparatus is disclosed. In one embodiment, the apparatus includes at least one computer program stored on a medium, the at least one program configured to, when executed, reduce a call drop rate.

A method of making an uninterrupted call is disclosed. In one embodiment, the method includes transferring data using a non-voice related background process on a mobile device; initiating a voice call on the same mobile device, and when the call has been initiated (or initiation of the call has been detected), at least temporarily suspending the background process (e.g., until the voice call is completed).

Other features and advantages of the present disclosure will immediately be recognized by persons of ordinary skill in the art with reference to the attached drawings and detailed description of exemplary embodiments as given below.

DETAILED DESCRIPTION

Overview

Figure 1:
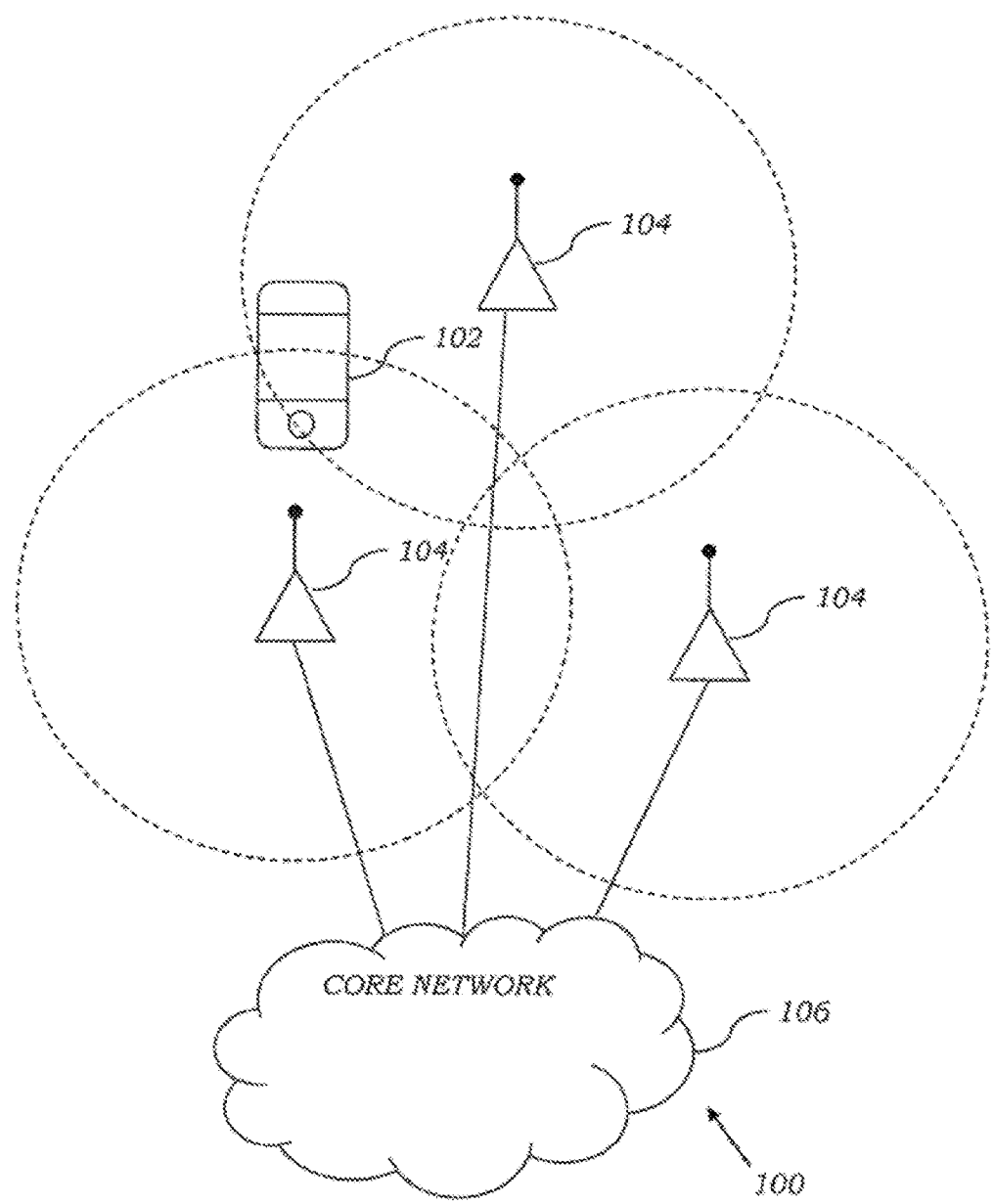
FIG. 1 is a graphical representation of one exemplary cellular network.

Reference is now made to the drawings, wherein like numerals refer to like parts throughout.

As noted above, smartphones utilize multiple background services (e.g., push services, pull services, location based services, Mail Exchange, and cloud services) to improve overall user experience.

However, existing smartphone devices do not account for the added burden of background services on ongoing tasks e.g., ongoing voice calls. Since background services can substantially increase the risk of dropped calls by creating a multi-RAB scenario, various embodiments are directed to suspending background processes during a voice call. Specifically, in one such embodiment, improved methods and apparatus for reducing call drop rate are disclosed. Background services that are not time-critical and/or application-critical can be suspended while a voice call is in progress. By suspending background traffic during a call, the device can avoid unnecessary multi-RAB voice call operation, which significantly improves overall network operation and user experience.

Description of Exemplary Embodiments

Exemplary embodiments are now described in detail. While these embodiments are primarily discussed in the context of cellular networks including without limitation, third generation (3G) wideband code division multiple access (WCDMA) and Universal Mobile Telecommunications Systems (UMTS) cellular networks, it will be recognized by those of ordinary skill that the present disclosure is not so limited. In fact, the various principles described herein are useful in and readily adapted to other cellular technologies including for example: Global System for Mobile Communications (GSM), General Radio Packet Service (GPRS), Enhanced Data Rates for GSM Evolution (EDGE), Long Term Evolution (LTE), LTE-Advanced (LTE-A), Interim Standard 95 (IS-95), Interim Standard 2000 (IS-2000, also referred to as CDMA-2000), CDMA 1xEV-DO, Time Division Single Carrier CDMA (TD-SCDMA), Time Division LTE (TD LTE), etc.

Moreover the principles detailed herein are not limited to cellular technologies (e.g., a "call" as described herein may be broadly interpreted to relate to any activity or process which has a possibility of being dropped or failing based on background activity). Hence, it will be recognized by artisans of ordinary skill given this disclosure that the present disclosure may be applicable to multiple areas of wireless technologies including for example, Wireless Local Area Networks (WLAN), Personal Area Networks (PAN), Metropolitan Area Networks (MAN). Common commercial examples of the foregoing include, without limitation, Wi-Fi®, WiMAX™, Bluetooth®, etc.

Cellular Networks

In the following discussion, an exemplary cellular radio system is described that includes a network of radio cells each served by a transmitting station, known as a cell site or base station (BS). The radio network provides wireless communications service for a plurality of mobile station (MS) devices. The network of BSs working in collaboration allows for wireless service which is greater than the radio coverage provided by a single serving BS. The individual BSs are connected to a Core Network, which includes additional controllers for resource management and is in some cases capable of accessing other network systems (such as the Internet, other cellular networks, etc.).

FIG. 1 illustrates one exemplary cellular network 100, with client devices 102, operating within the coverage of the Radio Access Network (RAN) provided by a number of base stations (BSs) 104. The Radio Access Network (RAN) is the collective body of base stations and associated network entities that are controlled by a Mobile Network Operator (MNO). The user interfaces to the RAN via the client devices, which in many typical usage cases is a cellular phone or smartphone. However, as used herein, the terms "mobile station", "mobile device", "client device", "user equipment", and "user device" may include, but are not limited to, cellular telephones, smartphones (such as for example the iPhone® manufactured by the Assignee hereof), personal computers (PCs) and minicomputers, whether desktop, laptop, or otherwise, as well as mobile devices such as handheld computers, PDAs, personal media devices (PMDs), tablet computers (such as for example the iPad® device manufactured by the Assignee hereof), or any combinations of the foregoing.

As shown in FIG. 1, the RAN is coupled to the Core Network 106 of the MNO e.g., via broadband access. The Core Network provides both routing and service capabilities. For example, a first client device 102 connected to a first base station 104 can communicate with a second client device connected to a second base station, via routing through the Core Network 106. Similarly, a client device can access other types of services e.g., the Internet, via the Core Network 106. The Core Network 106 performs a wide variety of functions, including without limitation, authentication of client devices, authorization of client devices for various services, billing client devices for provisioned services, call routing, etc.

Within the context of Universal Mobile Telecommunications Systems (UMTS) cellular networks, a logical connection for exchanging control and user data between the user equipment (UE) and the RAN is referred to as a radio access bearer (RAB). UMTS supports circuit-switched (CS) RAB, packet-switched (PS) RAB, and multi-RAB (which is one or more RAB).

A CS RAB reserves a dedicated communications channel for data communications. The channel remains connected for the duration of the communication session (even if no data is being transacted). Furthermore the CS RAB data is sequentially sent. In contrast, a PS RAB divides the data to be transmitted into packets that are transmitted through the network independently. Each individual packet may be sent multiple times, in out-of-sequence transmissions, etc. PS RABs can be throttled to carry more or less data based on existing conditions (e.g., amount of traffic, amount of capacity, etc.).

Artisans of ordinary skill in the art will recognize that voice calls can be highly compressed; however the compressed data must be delivered regularly. If voice call data is interrupted, the call will "break-up", and/or exhibit noticeable artifacts. Voice quality degradation is easily noticed, thus CS RABs are used to provide a dedicated channel for voice traffic to ensure on-time delivery of voice packets, and thus maximize voice call quality. In contrast, data services, including background services, can be implemented within a PS RAB. The PS RABs can vary the amount of bandwidth according to the amount of data traffic. Thus, PS RABs are ideal for bursty traffic (e.g., where the amount of data significantly varies), and/or infrequent traffic (e.g., where the data is unpredictably sent). Since background services are not directly observed by the human user, background services can be handled entirely in PS RAB.

Cellular networks offer different methods for users and applications to negotiate bearer characteristics for carrying information to improve quality of service (QoS). For example, WCDMA offers four (4) different traffic classes to group different applications and services: conversational, streaming, interactive, and background. The different classes relate to how delay sensitive particular traffic is. Certain services can be given priority (e.g. conversation and streaming classes to transmit voice communications and streaming multimedia respectively), whereas lower priority can be delayed using packet scheduling and transmitted as non-real-time packet data e.g. interactive and background classes to transmit web browsing and email downloads respectively.

UMTS networks additionally support a multi-RAB operation. Multi-RAB operation is used to support multiple RABs. For example, where a user has a voice call and data transaction occurring simultaneously, a multi-RAB call can handle the voice and data with a CS RAB and a PS RAB. Still other embodiments may support any number or combination of CS RAB or PS RAB (e.g., in some multi-RAB transactions, the device maintains multiple PS RAB, etc.). Unfortunately, it has been observed that multi-RAB operation significantly decreases connection robustness.

Multi-RAB connections that support a voice call (CS RAB) with data (PS RAB) are more likely to experience decreased performance, and in some cases, call failure. Cellular networks implement a wide variety of different codecs to encode the voice data. For example, UMTS employs the Adaptive Multi-Rate (AMR) technique. AMR is a speech codec that integrates eight different source rates (e.g., 12.2 kbps, 10.2 kbps, 7.95 kbps, 7.40 kbps, 6.70 kbps, 5.90 kbps, 5.15 kbps, and 4.75 kbps). The different bit rates are controlled by the network based on bandwidth availability and can be changed every 20 ms. A voice call CS RAB is performed with a 5.90 kbps AMR codec; however, a multi-RAB voice call must use a 12.2 kbps AMR codec. The power requirement (RF signal strength received from the base station) for the 12.2 kbps AMR codec is much higher than the 5.90 kbps; the higher power requirement is in addition to the power requirements for the data transmission.

Thus, a multi-RAB call requires significantly more received RF signal strength than a voice-only call, in addition to more complex signaling (e.g., to maintain both the CS RAB and the PS RAB). This added complexity is much more easily interrupted, thus multi-RAB calls are much less robust than a voice-only call.

Mobile Environment

As a brief aside, smartphones offer more advanced computing power than other mobile devices. Typical smartphones are equipped with various multimedia components (e.g., cameras, displays, speakers, and microphones), global positioning system (GPS), and sophisticated processors that can run a multitude of software applications. The smartphone operating system (OS) maintains a number of background services to further improve user experience by e.g., pre-fetching data, periodically storing data, memory management, network updates, and switching between applications.

Common examples of background services include, but are not limited to: (i) push services that can connect the mobile device to a push server and receive notifications allowing the phone to constantly receive updates from different applications on the mobile device; (ii) pull services that can connect to a server and request updates from different applications on the mobile device; (iii) location based services that can update an application with a user's location e.g. for driving directions applications; (iv) mail exchange services, to alert the user of an incoming email message; and (v) cloud services (such as for example iCloud®), for storing a user's documents and media, etc.

Background services may update at regular intervals (periodic), sporadically, or on an event-triggered basis. For example, a mail application may check for new emails every half an hour, whereas a social networking application that uses push notifications may send a notification only when there has been an update. Some services, e.g. push services, may require sending "keep alive" messages to the server at regular intervals to keep the connection active.

Methods

Based on the foregoing, it is desirable to attempt to avoid multi-RAB operation during an ongoing voice call, if at all possible. Accordingly, in one exemplary embodiment, a cellular device will disable or suspend background data services during a voice call, so as to avoid dropping the call or otherwise degrading its quality.

Figure 2:
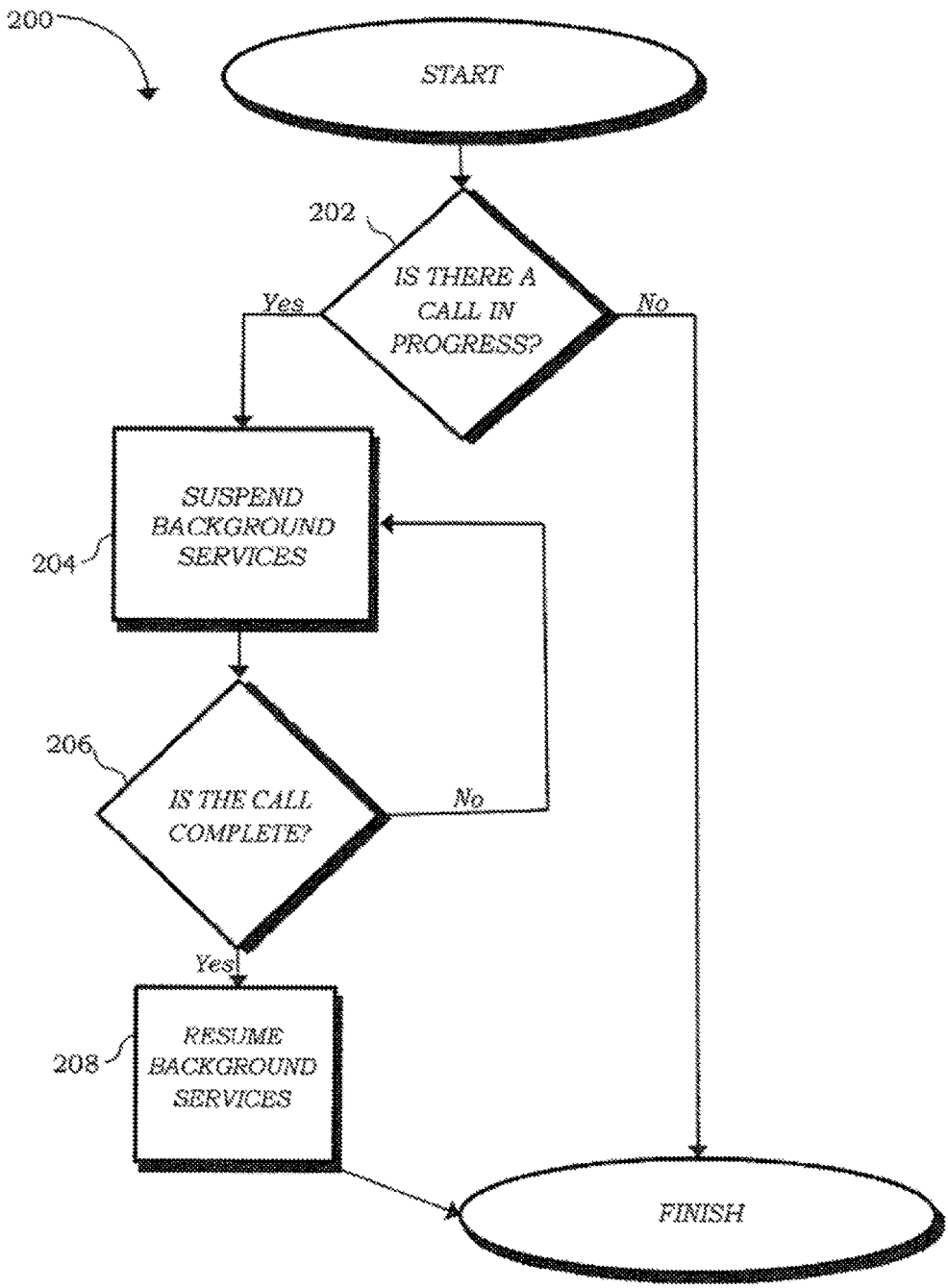
FIG. 2 is a logical flow diagram representing a generalized method for reducing voice call drop rate in a mobile device.

Referring now to FIG. 2, a logical flow diagram of one embodiment of a generalized method for reducing voice call drop rate is illustrated. While the following method is described in view of a CS RAB transitioning to a multi-RAB, it is appreciated that the principles described herein are useful in, inter alia, any application which undergoes a state change (such as a change in codec, algorithm, etc.) when transitioning radio access bearer operation (RAB). This may include PS RAB to multi-PS RAB transitions, CS RAB to multi-CS RAB transitions, CS RAB to multi-RAB, and PS RAB to multi-RAB, multi-RAB to CS RAB, multi-RAB to PS RAB, etc.

At step 202 of the method 200, the mobile device initiates or receives a circuit-switched call. In one exemplary embodiment, the call is a voice call. Other examples of circuit-switched calls include, without limitation, various streaming multimedia transactions, etc. In one common variant, the circuit-switched call is a so-called "mobile originated" voice call (i.e., the mobile device initiates the voice call). In other variants, the voice call is a so-called "mobile terminated" voice call (i.e., the mobile device receives the voice call).

The circuit-switched call is further associated with a first multimedia codec. For example, AMR codecs include eight different source rates (e.g., 12.2 kbps, 10.2 kbps, 7.95 kbps, 7.40 kbps, 6.70 kbps, 5.90 kbps, 5.15 kbps, and 4.75 kbps). In one exemplary embodiment, the circuit-switched call includes a CS RAB voice call operating with a 5.90 kbps Adaptive Multi-Rate (AMR) codec. Codecs span a wide range of capabilities and functionality, the foregoing being merely illustrative of a much broader spectrum.

For the duration of the circuit-switched call, the method 200 suspends background services (step 204). In one implementation of the inventive method, all services except an ongoing circuit-switched voice call are suspended. By suspending background services, the mobile device will not transition to a multi-RAB call unintentionally. In other implementations, only background services are suspended. In these cases, background services will not change the RAB, however the user may still elect to perform a function (such as surfing the Internet, etc.) that forces the device to change to multi-RAB operation.

In other embodiments, the mobile device only suspends a subset of services that are time-insensitive and/or non-critical. For example, within WCDMA networks, background services are time insensitive and would be suspended. In other networks, similar classifications can be used to prevent initiation of unintentional, non-critical, and/or time insensitive services during voice call activity. In some variants, the user may have configurable selection so as to further fine tune device operation, in view of user tastes (e.g., a user may disable all operation other than e.g., push notifications, etc.).

In still other embodiments, the mobile device may further indicate to the network that it is unreachable for unwanted services. For example, the mobile device may refuse to send "keep alive" signals for push notification operation; the push server will disable push notifications for devices which have not recently successfully provided "keep alive" signaling. Alternatively, the mobile device may explicitly message the base station, and the base station may responsively halt any background services, limit the bandwidth available for background services, etc.

In one embodiment, background services can be suspended using a toggle switch. The suspension can also be based on e.g., user input, user defined settings, and/or programmed settings. For example, the user may have a physical toggle switch that can be toggled to enable or disable background services during voice call operation. Alternately, a virtualized toggle switch may be provided via e.g., a touch screen interface, etc.

In still other embodiments, background services can be enabled or disabled via an internal software condition. For example, a software Boolean variable (e.g., TRUE, FALSE) can be used to enable or disable background services during voice calls. Similarly, software implementations may be based on e.g., a rules engine or an optimization scheme. In one such example, multiple conditions are considered when disabling or enabling background services, such as: performance loss, likelihood of failure, etc. For example, since multi-RAB induced call loss is due largely to insufficient received signal strength, in scenarios where the mobile device has strong signal reception, the device can retain background processes (the enhanced performance is not necessary). Similarly, the device may not suspend background processes if a more efficient, and robust codec is used. Still other variants are readily recognized by artisans in the related arts, given the contents of the present disclosure.

At step 206 of the method 200, the device performs the voice call.

Once the call has concluded, the device resumes background services that were suspended (step 208). In some embodiments, the background services require re-initialization (e.g., sending keep alive messages for push notifications or restarting sessions with network services that timed out due to the suspension). In some cases, the background services may be simply resumed.

Base Station Assisted Operation

In one embodiment, a base station is utilized to reduce the rate and likelihood of dropped calls. In an example embodiment, the wireless device is connected to the base station and the base station. The wireless device may initiate a CS session and/or a PS session. In an example embodiment, the base station is aware of the sessions conducted by the wireless device.

In a further embodiment, the base station may halt or limit bandwidth to PS sessions during the course of a CS session on a wireless device. PS sessions can be halted and/or delayed or enabled to continue via an internal software condition. For example, a software Boolean variable (e.g., TRUE, FALSE) can be used to halt/delay or enable services during CS sessions. Similarly, software implementations may be based on e.g., a rules engine or an optimization scheme. In one such example, multiple conditions are considered when halting/delaying or enabling PS sessions, such as: performance loss, likelihood of failure, an instruction by the wireless device, an estimate of connection strength (e.g. received signal strength of the wireless device), the type of PS session that is active and whether that type of session is time sensitive or critical, the type of CS session that is active, etc. For example, since multi-RAB induced call loss is due largely to insufficient received signal strength, in scenarios where the mobile device has strong signal reception, the base station can retain PS sessions (the enhanced performance is not necessary). Similarly, the base station may not suspend PS sessions if a more efficient, and robust codec is used. Still other variants are readily recognized by artisans in the related arts, given the contents of the present disclosure.

In other embodiments, the base station may decline to transmit data or delay the transmission of data from a PS session to a wireless device while a CS session is in progress.

Once a CS session has concluded, the base station may resume transmitting data from halted PS sessions to the mobile device, transmit data that was delayed due to the CS session, and/or reinitialize PS sessions.

Example Operation

Figure 3:
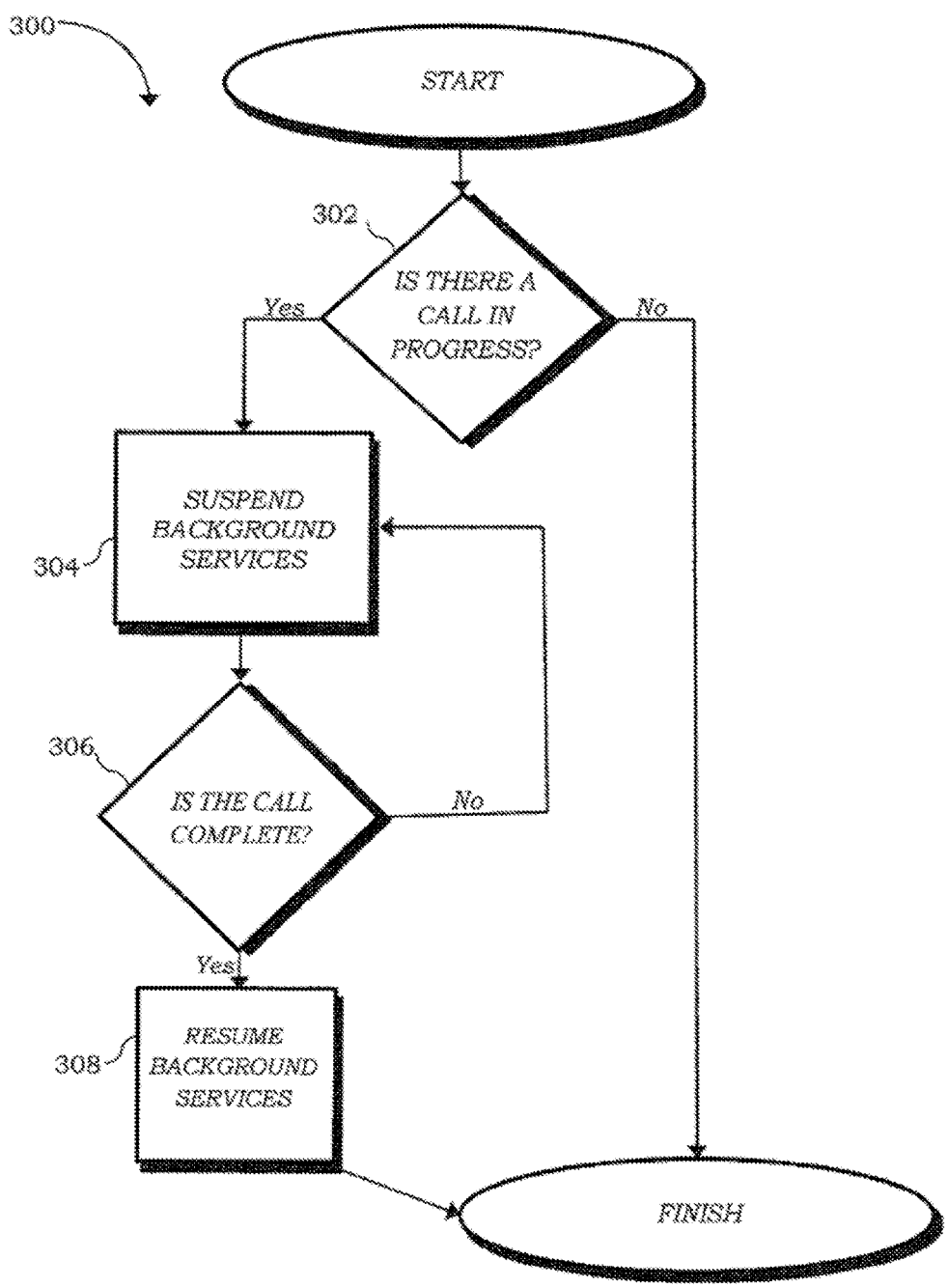
FIG. 3 is a logical flow diagram representing one exemplary implementation of the method for reducing voice call drop rate in a mobile device of FIG. 2.

Referring now to FIG. 3, one exemplary implementation of the generalized method 300 for reducing call drop rate is shown. In this example, the mobile device is a WCDMA-compliant smartphone. Voice calls are made using a circuit-switched radio access bearer (CS RAB) while background applications use packet-switched radio access bearer (PS RAB) to communicate over the network. The smartphone runs a number of background applications including an email application that automatically fetches new email messages every half an hour, a social networking application that uses push notifications to send updates to the phone, a cloud service to store data like pictures and music. Each background service automatically (without the user's knowledge) sends and/or retrieves data from the network.

Under prior art methods, these background services would run regardless of the state of the smartphone; i.e., whether or not a call was in progress. This would, by random chance, occasionally result in multi-RAB calls, which are more vulnerable to failure and/or voice quality degradation. However, according to one exemplary embodiment, the background services are suspended when a voice call is in progress. By suspending background services, the mobile device eliminates any chance occurrences of multi-RAB calls, thereby increasing overall voice call quality.

At step 302 of the method 300 the smartphone places or receives a voice call. The voice call includes a circuit-switched radio access bearer (CS RAB) for transacting voice data.

Responsively, at step 304 of the method 300, the smartphone suspends its background services. Background services that are classified within the background traffic class are halted, suspended, etc.

For example, the mobile phone may stop sending "keep alive" signals to a push server for a social networking application. This may end the connection with the push server.

In another example, the mobile device may delay fetching mail requests. This would mean that the smartphone during a phone call will not automatically check for new email, or automatically download email during the voice call.

In still another example, the mobile device suspends synchronizing to cloud services to backup new data from the smartphone to the cloud, or synchronizing new data in the cloud onto the smartphone. In more aggressive implementations, active data sessions can be delayed or suspended to further reduce the risk of multi-RAB calls.

Still other embodiments may prevent unintentional multi-RAB operation, but still allow intentional multi-RAB operation. For example, communications within the conversational class, streaming class, and interactive class, are not delayed or suspended and may continue operating normally. Accordingly, a user may still, for instance, look up a map on the phone while having a conversation, but the device would not automatically check a user's email. In one such variant, a user is allowed to expressly choose to use a service (and operate multi-RAB). For example, a user may expressly check their email inbox and download a new message during a phone call. In this variant, a user would have to expressly choose to access the service and go multi-RAB and without so choosing the phone would delay the service, for example checking email. In a further embodiment, each potential service to use the network is determined individually whether it is critical or not. If critical then it is not suspended or delayed, if not then it is suspended or delayed.

At step 306, the device executes the voice call.

Once the voice call ends, the smartphone resumes background services.

Apparatus

Figure 4:
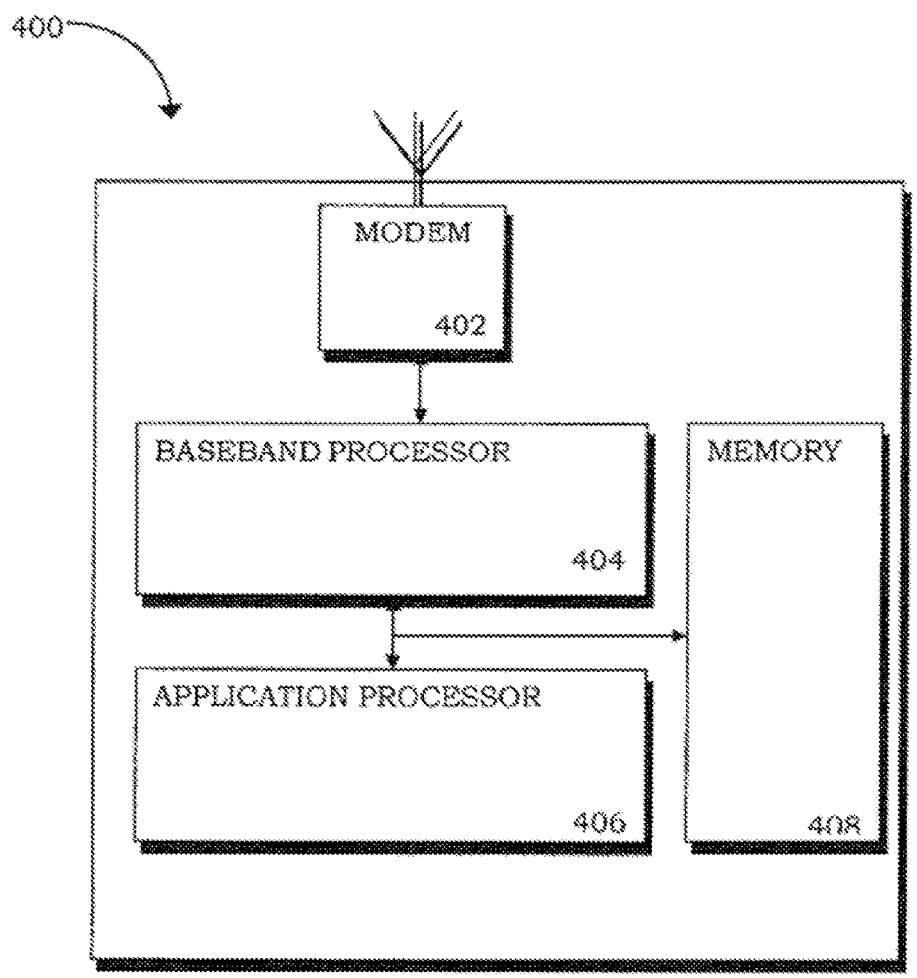
FIG. 4 is a graphical representation of one exemplary embodiment of a client device.

Referring now to FIG. 4, one exemplary client device 400 adapted to reduce the voice call drop rate is illustrated. As used herein, the term "client device" includes, but is not limited to cellular telephones, smartphones (such as for example an iPhone®), wireless-enabled tablet devices (such as for example an iPad®), or any combinations of the foregoing. While one specific device configuration and layout is shown and discussed herein, it is recognized that many other configurations may be readily implemented by one of ordinary skill given the present disclosure, the apparatus 400 of FIG. 4 being merely illustrative of the broader principles described herein.

The apparatus 400 of FIG. 4 includes a modem 402, a baseband processor 404, an applications processor 406 and a computer readable memory subsystem 408.

The baseband processing subsystem 404 includes one or more of central processing units (CPU) or digital processors, such as a microprocessor, digital signal processor, field-programmable gate array, RISC core, or plurality of processing components mounted on one or more substrates. The baseband processing subsystem is coupled to computer readable memory 408, which may include for example SRAM, FLASH, SDRAM, and/or HDD (Hard Disk Drive) components. As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM.

The baseband processing subsystem 404 is adapted to receive one or more data streams from the modem 402. In an example embodiment the modem 402 is a WCDMA modem. Alternate embodiments may have multiple modems and baseband processing systems corresponding to each modem. In fact, the various embodiments are useful in and readily adapted to any multi-mode combination of one or more of the following: General Radio Packet Service (GPRS), Enhanced Data Rates for GSM Evolution (EDGE), Long Term Evolution (LTE), LTE-Advanced (LTE-A), Interim Standard 95 (IS-95), Interim Standard 2000 (IS-2000, also referred to as CDMA-2000), CDMA 1×EV-DO, Time Division Single Carrier CDMA (TD-SCDMA), Time Division LTE (TD LTE), etc.

The application processing subsystem 406 includes one or more of central processing units (CPU) or digital processors, such as a microprocessor, digital signal processor, field-programmable gate array, RISC core, or plurality of processing components mounted on one or more substrates. The application processing subsystem is coupled to computer readable memory 408.

The application processing subsystem 406 is adapted to control overall operation of the device including, for example: multimedia processing, operating system controls, program management, baseband processor configuration and control, etc.

In one exemplary embodiment of the device, the memory subsystem additionally includes instructions which when executed by the application processor, determines whether a call is in progress, suspends background services if a call is in progress, determining when the call is complete, and resuming suspended background services when the call is complete. Other logical functions (such as e.g., determining the traffic classification of certain services) are also performed by logic within the memory subsystem 408 in the exemplary embodiment.

Myriad other schemes for client-based (and/or network-based) capabilities management for reducing voice call drop rate will be recognized by those of ordinary skill given the present disclosure.

It will be recognized that while certain embodiments are described in terms of a specific sequence of steps of a method, these descriptions are only illustrative of the broader methods of the present disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the principles disclosed and claimed herein.

While the above detailed description has shown, described, and pointed out novel features as applied to various embodiments, it will be understood that various omissions, substitutions, and changes in the form and details of the device or process illustrated may be made by those skilled in the art without departing from the disclosed principles. The foregoing description is of the best mode presently contemplated. This description is in no way meant to be limiting, but rather should be taken as illustrative of the general principles. The scope of the present disclosure should be determined with reference to the claims.

What is claimed is:

1. A method for increasing call performance of a wireless device configured to support one or more radio access bearers (RABs), the method comprising:
   at the wireless device:
   running one or more background applications, at least one of the one or more background applications in communication with a network via a RAB associated therewith;
   responsive to initiating an additional application in communication with the network via an additional RAB associated therewith:
      determining a likelihood that the additional application will fail when the at least one of the one or more background applications operates concurrently with the additional application, and
      suspending the at least one of the one or more background applications, when the determined likelihood exceeds a failure threshold; and
   responsive to termination of the additional application, resuming, when suspended, the at least one of the one or more background applications.

2. The method of claim 1, wherein the one or more background applications include packet-switched applications.

3. The method of claim 1, wherein the additional application includes a packet-switched application.

4. The method of claim 1, wherein the additional application includes a voice call.

5. The method of claim 1, wherein the wireless device is connected to the network through a first base station for communication associated with the background applications and the additional application.

6. The method of claim 1, wherein the determined likelihood is based at least in part on a difference between a first bit rate of the RAB and a second bit rate of a combination of the RAB and the additional RAB.

7. The method of claim 1, wherein the one or more background applications include one of: a mail exchange service configured to communicate electronic mail messages; a cloud-based storage service configured to store user data at a remote network entity; and a push notification service configured to provide user alerts.

8. The method of claim 1, wherein suspension of the at least one of the one or more background applications is based on a user selection.

9. The method of claim 1, wherein the at least one of the one or more background applications are time-insensitive non-critical services.

10. An apparatus configured to improve connection performance of a wireless device configured to support communication with a wireless network through one or more radio access bearers (RABs), the apparatus comprising:
   a modem;
   a processor; and
   a non-transitory computer-readable storage medium having at least one computer program stored thereon, the at least one computer program configured to, when executed on the processor, cause the apparatus to:
      run one or more non-voice applications, at least one of the one or more non-voice applications in communication with the wireless network via a RAB associated therewith;
      responsive to initiating a voice application in communication with the wireless network via an additional RAB associated therewith:
         determine a likelihood that the voice application will fail when the at least one of the one or more non-voice applications operates concurrently with the voice application, and suspend the at least one of the one or more non-voice applications, when the determined likelihood exceeds a failure threshold; and responsive to termination of the voice application, resume, when suspended, the at least one of the one or more non-voice applications.

11. The apparatus of claim 10, wherein the one or more non-voice applications include packet-switched applications.

12. The apparatus of claim 10, wherein the voice application includes a packet-switched application.

13. The apparatus of claim 10, wherein the apparatus is connected to the wireless network through a first base station for communication associated with the non-voice applications and the voice application.

14. The apparatus of claim 10, wherein the determined likelihood is based at least in part on a difference between a first bit rate of the RAB and a second bit rate of a combination of the RAB and the additional RAB.

15. The apparatus of claim 10, wherein the one or more non-voice applications include one of: a mail exchange service configured to communicate electronic mail messages; a cloud-based storage service configured to store user data at a remote network entity; and a push notification service configured to provide user alerts.

16. The apparatus of claim 10, wherein suspension of the at least one of the one or more non-voice applications is based on a user selection.

17. The apparatus of claim 10, wherein the at least one of the one or more non-voice applications are time-insensitive non-critical services.

18. A method to improve connection performance of a wireless device configured to communicate with a wireless network using one or more radio access bearers (RABs), the method comprising:

by the wireless device:

while running one or more background applications, communicating data via a RAB with the wireless network;

detecting a user-initiated process to run an additional application communicating data using an additional RAB with the wireless network;

inhibiting concurrent operation of at least one of the one or more background applications with the additional application by suspending the at least one of the one or more background applications, when a likelihood that the additional application will fail when operating currently with the at least one of the one or more background applications exceeds a failure threshold; and in response to detecting termination of the additional application, resuming, when suspended, the at least one of the one or more background applications.

19. The method of claim 18, wherein the determined likelihood is based at least in part of a difference between a first bit rate of the RAB and a second bit rate of a combination of the RAB and the additional RAB.

20. The method of claim 18, wherein the additional application includes a voice call.

* * * * *